Figure 1:
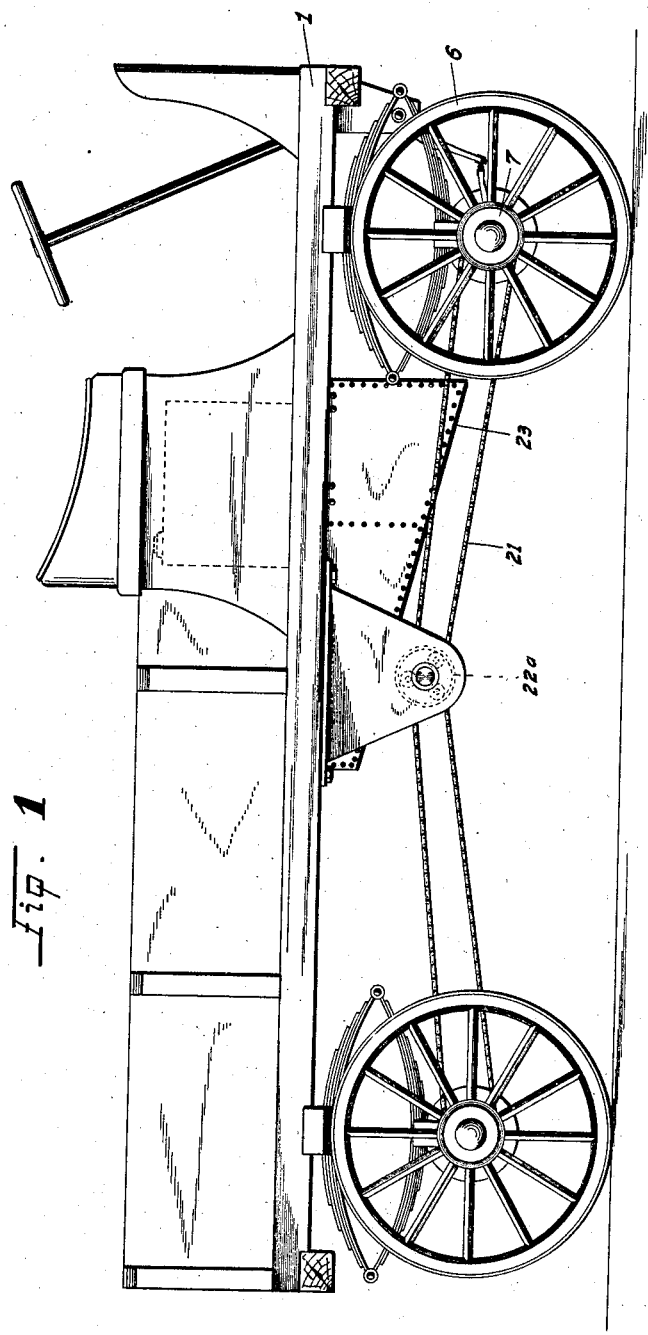

No. 891,467.

PATENTED JUNE 23, 1908.

J. H. DIEL.
VEHICLE.
APPLICATION FILED FEB. 18, 1907.

2 SHEETS—SHEET 1.

Witnesses

Inventor
Joseph H. Diel
By Percy S. Webster
Attorney

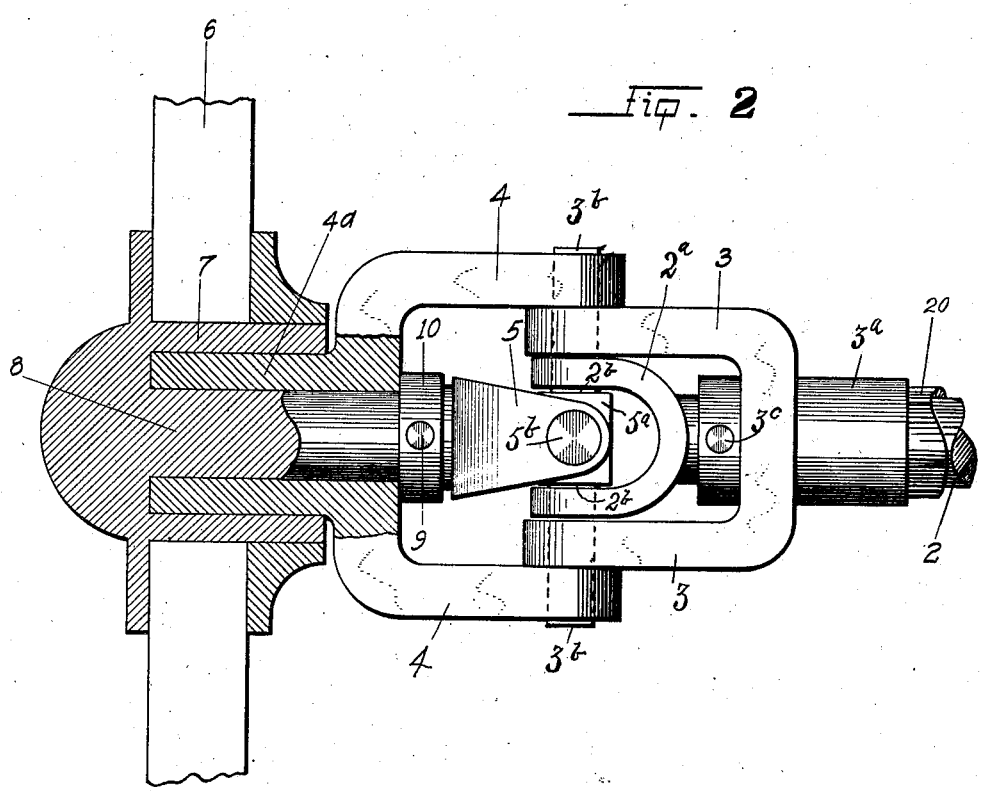

UNITED STATES PATENT OFFICE.

JOSEPH H. DIEL, OF STOCKTON, CALIFORNIA.

VEHICLE.

No. 891,467.  Specification of Letters Patent.  Patented June 23, 1908.

Application filed February 18, 1907. Serial No. 357,829.

*To all whom it may concern:*

Be it known that I, JOSEPH H. DIEL, a citizen of the United States, residing at Stockton, in the county of San Joaquin, State of California, have invented certain new and useful Improvements in Vehicles; and I do declare the following to be a full, clear, and exact description of the same, such as will enable others skilled in the art to which it appertains to make and use the same, reference being had to the accompanying drawings, and the characters of reference marked thereon, which form a part of this application.

This invention relates to improvements in vehicles, and particularly to those propelled by steam, my object being to produce a vehicle of improved construction and increased utility.

Another object of the invention is to produce a vehicle which is adapted to travel in hilly country and on rough, muddy or sandy roads without the incidental break downs, delays and general inconveniences which are frequently experienced.

These objects I accomplish by the general arrangement and construction of parts hereinafter fully set forth in the following specification and claims, and particularly by applying power to the front axle of the machine in such manner as will appear.

In the drawings similar characters of reference indicate corresponding parts in the several views, in which:

Figure 1 is a side elevation of my improved vehicle, and Fig. 2 is a fragmentary view of a wheel bearing and steering knuckle.

Referring more particularly to the drawings, the numeral 1 designates the body of the vehicle. Said vehicle is provided with a front wheel bearing which is constructed as follows: In Fig. 2 is shown one of the coupling mechanisms between the forward axle and the forward bearing wheels, but as the mechanisms at each end of the axle are precisely the same, one of these mechanisms only is shown. The axle 2 is provided at its ends with yokes $2^a$, while the wheels 6 are provided with hubs 7 having stub axles 8 extending inwardly therefrom provided with a stop collar 10 removably secured thereto having an integral yoke 5 mounted thereon and movably coupled therewith by a block $5^a$ having pins $5^b$ and $2^b$, the pins $5^b$ forming pivotal connections with the yoke 5 and the pins $2^b$ forming pivotal connections with the yoke $2^a$. The stub axles 8 and the main axle 2 are thus connected by a "universal coupling" as shown. Between the hub 7 of the wheels 6 and the stub axles 8 an annular bearing is formed in which sleeves $4^a$ are mounted for rotation, the sleeves having arms 4 projecting therefrom. Mounted upon the axle 2 are intermediate axles 20 upon which are mounted collars $3^a$ and secured thereto as by pins $3^c$, and extending from the collars are arms 3 adapted to be pivotally connected to the arms 4 by pins $3^b$. Surrounding the stub axle 8 between the yoke 5 and the inner end of the sleeve $4^a$ is a stop collar 10 secured to the stub axle by pin 9. This arrangement just described is extremely advantageous in that it provides wheels formed as direct parts of the driving shaft, said wheels having double bearing surfaces by reason of the stub axles 8 bearing within the sleeves $4^a$ and the hubs proper of which the said members 8 are a part, bearing on the outside of said sleeves. Thus it will be seen, that I have produced an admirable wheel bearing and steering knuckle combined, which forms a double bearing surface for the wheel and yet has the wheel formed as a part of the driving axle.

The above description sets forth the main details of construction of my improved vehicle while the following claims define the actual scope thereof. However, in practice, this detailed construction will probably be somewhat departed from but said departure will not amount to a departure from the spirit of the invention.

Having thus described my invention, what I claim as new and useful and desire to secure by Letters Patent is:

1. A wheel hub provided with a stub axle extending therefrom and having a stop-collar keyed thereto, provided with an integral yoke and with an annular bearing recess between the body of the hub and said stub axle, a driving axle having a yoke, coupling means between said yokes, a sleeve within the bearing recess of the hub and provided with spaced arms, and an intermediate axle carried by said driving axle and having a collar keyed thereto provided with spaced arms and pivotally connected to the arms of said sleeve.

2. A wheel hub provided with a stub axle extending inwardly therefrom and provided with a stop-collar having an integral yoke, on the end thereof, a block positioned within said yokes and provided with oppositely arranged pins forming pivotal connections between said yokes, an annular bearing recess between the body of the hub and said stub axle, a sleeve within the bearing recess of the hub and provided with spaced arms, said stop-collar being detachably-secured to said stub axle and bearing against said sleeve, an intermediate axle carried by said driving axle and a collar keyed to said intermediate axle, said collar provided with spaced arms pivotally connected to the arms of said sleeve substantially as set forth.

In testimony whereof I affix my signature in presence of two witnesses.

JOSEPH H. DIEL.

Witnesses:
PERCY S. WEBSTER,
FRANK H. CARTER.